Feb. 21, 1967  D. A. WILLEY  3,305,049
POWER OPERATED WHEEL BLOCKS
Filed May 6, 1965

INVENTOR
DONALD A. WILLEY

BY Gerald P. Welch
ATTORNEY

3,305,049
POWER OPERATED WHEEL BLOCKS
Donald A. Willey, 1910 S. Grand Ave.,
Waukesha, Wis. 53186
Filed May 6, 1965, Ser. No. 453,723
1 Claim. (Cl. 188—32)

This invention relates to improvements in power operated wheel blocks, and more particularly to a novel power operated wheel block adapted for installation adjacent to a conventional truck loading dock.

An object of the invention is to provide a device of the type which may be power controlled to set a block against a wheel or wheels of a truck which has been backed into position adjacent a loading dock.

Another object of the invention is to provide a power operable wheel block which may automatically be placed in the path of a truck wheel or wheels and as easily removed.

Other and further objects of the invention will appear as the description proceeds, reference being had to the accompanying drawing, in which.

Figure 1:
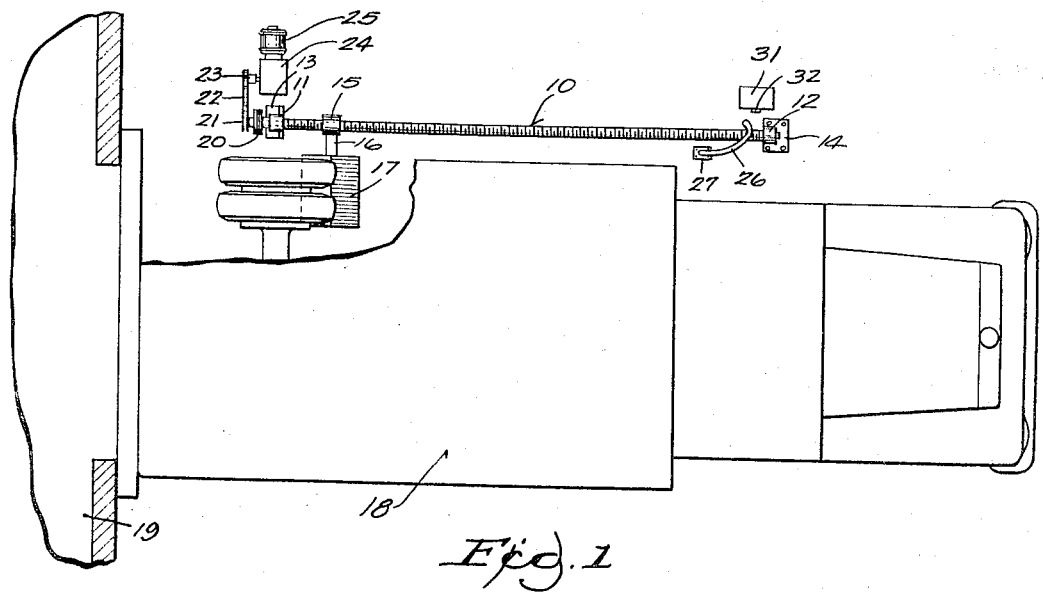
FIG. 1 is a plan view of a power operated wheel block embodying the invention.
Figure 2:
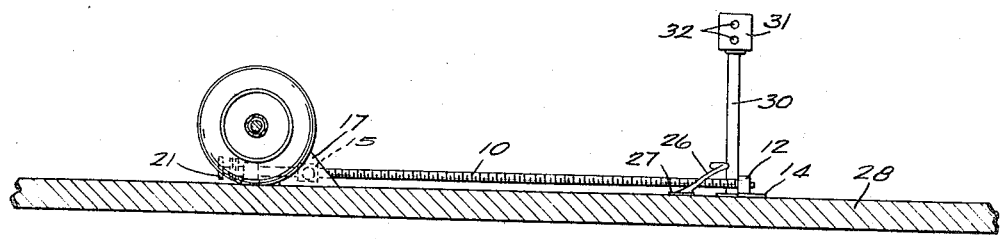
FIG. 2 is a side view in elevation of the device.
Figure 3:
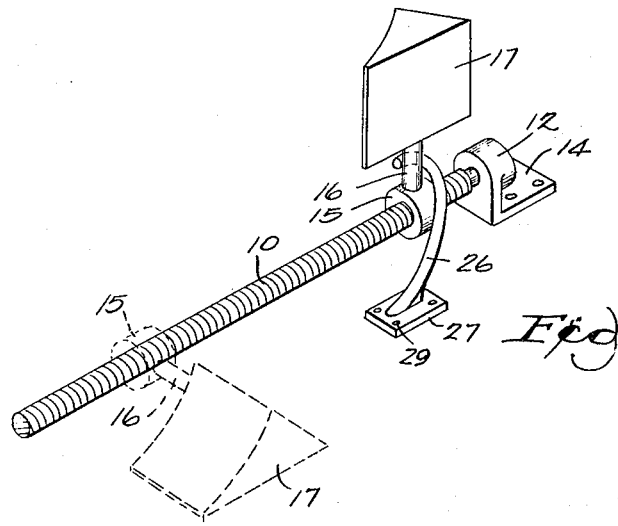
FIG. 3 is a fragmentary view in perspective from above showing the operation of the lift guide.

Referring more particularly to the drawing, the numeral 10 refers to an elongated rotatable screw element journalled in bearings 11 and 12 in the floor mounts 13 and 14. A nut 15 is meshed on said screw element 10 and has an integral arm 16. A wheel block 17 is affixed to the free end of said arm 16. The screw element 10 is mounted parallel to the path of a truck 18 shown in FIG. 1 as backed to the loading dock 19. The screw element 10 is provided with the slip clutch 20 and a pulley 21 engaged with the belt 22 also on pulley 23 operable by the gear reducer 24 and the electrical motor 25. At the opposite end of the screw element 10, a lift guide 26 having a base 27 is affixed to the floor 28 by threaded means 29 and serves to lift the arm 16 and block 17 out of the path of the wheels of a backing truck 18. A standard 30 has at the top thereof a switchbox 31 with convenient buttons 32 to enable a truck operator to energize the motor 25 in order to block the wheel of a truck 18, and to return the block 17 in the lifted out of the way position shown in FIG. 3.

It will be understood that the device is capable of many modifications in structure and design, without departing from the spirit of the invention, within the scope of the appended claims.

Having thus described the invention, what is claimed and desired to be secured by Letters Patent of the United States, is:

A power operated wheel blocking device including an elongated vehicle flanking screw, end supports journalling the latter, a nut engaged on said screw, a triangular chock, an arm rigidly connecting said chock with said nut, a motor for driving said screw, a speed reducer associated therewith, a belt operably connecting said speed reducer with said screw, a standard, a push button motor control thereon reachable by an occupant of a vehicle, and inclined lift guide fixed adjacent one end of said screw for intercepting said connecting arm to lift said chock upwardly out of the path of a vehicle.

References Cited by the Examiner

UNITED STATES PATENTS

| | | | |
|---|---|---|---|
| 1,414,683 | 5/1922 | Anglada | 254—103 |
| 2,079,992 | 5/1937 | Gonzalez | 188—32 |
| 2,418,279 | 4/1947 | Sax | 188—32 |
| 2,746,745 | 5/1956 | Damon | 268—30 X |
| 2,758,836 | 8/1956 | Purdy | 268—59 |
| 2,773,564 | 12/1956 | Garard | 188—32 |

MILTON BUCHLER, *Primary Examiner.*

B. S. MOWRY, *Assistant Examiner.*